United States Patent
Kato et al.

[11] Patent Number: 5,859,875
[45] Date of Patent: Jan. 12, 1999

[54] TRANSMITTER, RECEIVER, COMMUNICATION SYSTEM, AND COMMUNICATION METHOD EMPLOYING SPREAD SPECTRUM COMMUNICATION TECHNIQUE

[75] Inventors: Hideki Kato; Shinichi Yamazaki; Hideaki Ugawa; Kazuhiko Seki, all of Tokyo, Japan

[73] Assignee: Uniden Corporation, Tokyo, Japan

[21] Appl. No.: 789,237

[22] Filed: Jan. 28, 1997

[30] Foreign Application Priority Data

Oct. 1, 1996 [JP] Japan .................................. 8-260497

[51] Int. Cl.⁶ ...................................................... H04B 7/02
[52] U.S. Cl. ........................... 375/267; 375/299; 375/347; 455/101; 455/136; 455/138; 455/140; 455/277.1
[58] Field of Search ...................................... 375/200, 206, 375/260, 267, 299, 347; 455/101, 133–138, 140, 272, 277.1; 370/320, 342, 465, 474, 476

[56] References Cited

U.S. PATENT DOCUMENTS

| 5,390,239 | 2/1995 | Morris et al. | 379/93 |
| 5,652,764 | 7/1997 | Kanzaki et al. | 375/200 |
| 5,710,995 | 1/1998 | Akaiwa et al. | 455/277.2 |

FOREIGN PATENT DOCUMENTS

| 1-288023 | 11/1989 | Japan . |
| 21-107036 | 4/1990 | Japan . |
| 2-132935 | 5/1990 | Japan . |
| 2-132936 | 5/1990 | Japan . |
| 4-79438 | 3/1992 | Japan . |
| 4-199926 | 7/1992 | Japan . |
| 4-199927 | 7/1992 | Japan . |
| 6-284054 | 10/1994 | Japan . |
| 8-65201 | 3/1996 | Japan . |
| 8-65224 | 3/1996 | Japan . |

*Primary Examiner*—Amanda Le
*Attorney, Agent, or Firm*—McDermott, Will & Emery

[57] ABSTRACT

Transmission mode selection is enabled, so communication reliability, transmission speed, and equipment utilization efficiency are all high. A first transmission system whereby spectrum spreading is accomplished with a spread code 1 and data is transmitted, and a second transmission system whereby data is transmitted with a spread code 2, are provided. In high-reliability transmission mode, identical data from a data buffer is transmitted through both the first and second transmission systems to achieve space diversity. In high-speed mode, data divided by a data division circuit is transmitted simultaneously through the first and second transmission systems, making possible efficient data transfer. Control information insertion circuits append transmission mode data to the transmitted data.

18 Claims, 10 Drawing Sheets

TRANSMITTER, RECEIVER, COMMUNICATION SYSTEM, AND COMMUNICATION METHOD EMPLOYING SPREAD SPECTRUM COMMUNICATION TECHNIQUE

BACKGROUND OF THE INVENTION

1. Field of the Invention

The present invention relates to a transmitter, a receiver, a communication system, and a communication method which employ a spread spectrum communication technique.

2. Description of the Related Art

In recent years, communication systems which employ the spread spectrum communication technique have attracted considerable attention. The spread spectrum communication technique is a technique for communication whereby the baseband signal is spread over a wide bandwidth by means of a spread code. It is characterized by enhanced privacy and excellent capabilities in eliminating interference. Since the same data can be transmitted simultaneously over the same bandwidth, it is employed in diversity communication systems. An example of a conventional communication system of this type is disclosed in Japanese Laid-Open patent application 8-65201.

In this example of the prior art, the receiver is provided with two reception systems, and reception quality is improved by selecting the output of the system having the better reception quality.

While this conventional communication system does afford improved communication quality, it requires dual reception systems and dual transmission systems, and therefore entails a more complex design and higher equipment costs. The performance required of a system, the environment in which it is used, and similar factors generally differ from one system to another, and it is not the case that extremely high communication quality is required in all systems. Furthermore, where a plurality of terminals communicate with a single base station, the performance requirements differ from terminal to terminal. For example, terminals located in environments characterized by high levels of fading and noise require implementation of diversity in addition to the spread spectrum communication technique in order to ensure adequate communication quality, while other terminals not subjected to the effects of these to the same degree do not require diversity, and the spread spectrum communication technique alone may suffice. In the latter case, one of the two transmission systems and reception systems is idle. This cannot be said to represent an efficient communication system.

SUMMARY OF THE INVENTION

The present invention was developed in order to address the foregoing issue, and is intended to provide a transmitter, a receiver, a communication system, and a communication method which offer improved reliability of communication, transmission speed, and equipment utilization efficiency in a communication system, and which afford an overall improvement in performance.

A further object is to provide a transmitter, a receiver, a communication system, and a communication method which permit selection of a communication mode best suited to the performance required of the equipment.

A still further object is to provide a transmitter, a receiver, a communication system, and a communication method which permit switching between communication methods at will.

The transmitter which pertains to this invention comprises transmission format control means for deciding whether to perform data transmission in a first transmission mode or in a second transmission mode; data division means for dividing data for transmission into a first portion and a second portion in the event that data is to be transmitted in the second transmission mode; a first transmission system which uses a first code for spreading the data to be transmitted in the event that the data is to be transmitted in the first transmission mode, or which uses the first code for spreading the first portion of the data in the event that the data is to be transmitted in the second transmission mode, and which transmits the data, and; a second transmission system which uses a second code for spreading the data to be transmitted where the data is to be transmitted in the first transmission mode, or which uses the first code for spreading the second portion of the data where the data is to be transmitted in the second transmission mode, and which transmits the data.

The transmitter has two transmission modes, a first transmission mode and a second transmission mode. These modes are: a high-reliability transmission mode employing space diversity and time diversity; and a multiplexed high-speed transmission mode employing spread spectrum. The transmission format control means selects one of these transmission modes as appropriate. Depending on the transmission mode selected, a determination is made as to whether to divide the data for transmission, or to multiplex the same data for transmission. In the example depicted in FIG. 1, the components ranging from the data selection circuit 103a to the antenna 109a are included in the first transmission system. The components ranging from the data selection circuit 103b to the antenna 109b are included in the second transmission system. More than two transmission systems may be provided, and the invention encompasses the use of three or four transmission systems in multiplexing.

Examples of the method by which the transmission format control means makes the selection are: (1) a terminal-specific specific assignment technique; (2) a terminal-initiated non-periodic switching technique enabled when high-speed transmission is required; (3) an error rate-prompted switching technique; (4) a remaining transmission buffer capacity-prompted automatic switching technique; (5) a re-sent frame high-reliability transmission switching technique; (6) a transmitted data contents-prompted switching, and; (7) a protocol-prompted switching technique.

The spreading process constitutes generally known spread spectrum technology. The DS (direct sequence) technique is well-known. Modulation by DPSK or QPSK is performed in conjunction with spreading using a spread code. Spread codes include M sequences, non-M sequences, GOLD sequence codes, and multivalue sequences. Codes with low cross-correlation are selected for use as the first code and second code.

The transmitter pertaining to this invention is equipped with a reception system for receiving data from the outside. The aforementioned transmission format control means decides upon the transmission mode on the basis of data received by the reception system.

The transmitter switches between transmission modes on the basis of a request from an external device such as a receiver. An example would be technique (2), terminal-initiated non-periodic switching enabled when high-speed transmission is required.

The transmitter pertaining to this invention is equipped with first control information insertion means for appending information concerning the transmission mode to the data input to the aforementioned first transmission system, and with second control information insertion means for appending information concerning the transmission mode to the data input to the aforementioned second transmission system.

These control information insertion means transmit information regarding the transmission mode being used to the receiving side, and this allows the transmission mode to be switched for each data transmission, thereby providing a more flexible transmission method.

In the transmitter pertaining to this invention, the data division means divides the data to be transmitted into predetermined units and appends information regarding the divisions to the transmitted data.

Possible units of division include frame units, bit units, byte units, word units, and long word units. By appending information regarding the division to the transmitted data, it becomes possible to change the unit of division for each data transmission, thereby providing a more flexible transmission method.

In the transmitter pertaining to this invention, the data division means can divide data on a per-channel basis in the event that the data for transmission has multiple independent channels.

Examples of division are allocation of the two outputs of a convolutional encoder and allocation of the left and right stereo channels of a digital voice transmission.

The receiver which pertains to this invention is equipped with a first reception system for despreading transmitted data with a first code; a second reception system for despreading transmitted data with a second code; reception format control means for determining whether data transmission has been performed in the first transmission mode or the second transmission mode; selection means for selecting and outputting either data output by the aforementioned first reception system or data output by the aforementioned second reception system, whichever has better communication quality, when data is transmitted in the aforementioned first transmission mode, and; combining means for combining data output by the aforementioned first reception system with data output by the aforementioned second receiver when data is transmitted in the aforementioned second transmission mode.

This receiver has two transmission modes, a first transmission mode and a second transmission mode. These modes are: a high-reliability transmission mode employing space diversity or time diversity; and a multiplexed high-speed transmission mode employing spread spectrum. The reception format control means determines which of the transmission modes has been used for transmission. Depending on the transmission mode, a decision is made either to select one of the data outputs for output or to combine it with multiplexed data for output. In the example depicted in FIG. 2, the components ranging from the despreading circuit 204a through the control information extraction circuit 206a are included in the first reception system. The components ranging from the despreading circuit 204b through the control information extraction circuit 206b are included in the second reception system. More than two reception systems may be provided in conjunction with the transmission systems, and the invention encompasses the use of three or four transmission systems in multiplexing. Components ranging from the antenna 201 through the demodulator 203 may be provided in plurality, and space diversity can be implemented on the receiving side.

The selection means selects the signal having better communication quality. Criteria for communication quality include data error rate, reception level, and the like. Where the data has been divided, the combining means combines the divided data to reconstitute the original data.

The receiver pertaining to this invention is equipped with a transmission system for transmitting data to the outside. This transmission system transmits data specifying the transmission mode.

The transmission mode is determined at the receiver side on the basis of conditions on the receiver side, which sends its request to the transmitter in order to switch the Transmission mode. An example would be technique (2), terminal-initiated non-periodic switching enabled when high-speed transmission is required.

The receiver pertaining to this invention is equipped with a first control information extraction means for extracting information relating to the transmission mode from the data obtained through the aforementioned first reception system and a second control information extraction means for extracting information relating to the transmission mode from the data obtained through the aforementioned second reception system. The aforementioned reception format control means determines the transmission mode on the basis of output from the aforementioned first control information extraction means, second control information extraction means, or both.

At the receiving side, these control information extraction means extract data relating to the transmission mode used at the transmitting side. This allows the system to adapt to changes in the transmission mode between data transmissions, thereby providing a more flexible transmission method.

In the receiver pertaining to this invention, the aforementioned combining means perform combination on the basis of the information pertaining to the divisions, which information has been appended to the data.

Regardless of the manner of division or whether division has been performed on a per-channel basis, the divided data can be combined correctly and reconstituted. This allows the division method to be switched for each data transmission, thereby providing a more flexible transmission method.

The communication system which pertains to the present invention is equipped with any of the aforementioned transmitters and any of the aforementioned receivers, and performs communication using either the aforementioned first transmission mode or the aforementioned second transmission mode.

The communication method which pertains to this invention comprises a transmission mode decision step whereby the first transmission mode or the second transmission mode is selected for data transmission; a first spreading step whereby, in the event that data is to be transmitted in the aforementioned first transmission mode, the same data is subjected separately to spreading with a first code and to spreading with a second code, and each of these coded forms is output; a division step whereby, in the event that data is to be transmitted in the aforementioned second transmission mode, the data is divided into a first portion and a second portion; a second spreading step whereby the data of the aforementioned first portion is spread using the aforementioned first code and then output, and the data of the aforementioned second portion is spread using the aforementioned second code and then output; a despreading step whereby transmitted data is despread with the aforementioned first code and with the aforementioned second code; a transmission mode determination step whereby a determination is made as to whether data transmission has taken place in the aforementioned first transmission mode or in the aforementioned second transmission mode; a selection step whereby, in the event that it is determined that the data has been transmitted in the aforementioned first transmission mode, either the data that has been despread with the aforementioned first code in the aforementioned despreading step or the data that has been despread with the aforementioned second code is selected, depending upon which has the better communication quality; and a combining step whereby, in the event that it is determined that the data has been transmitted in the aforementioned second transmission mode, the data that has been despread with the aforementioned first code in the aforementioned despreading step is combined with the data that has been despread with the aforementioned second code.

DESCRIPTION OF THE PREFERRED EMBODIMENTS

Embodiment 1 of the Invention

The spread spectrum communication system, transmitter, receiver, and communication method pertaining to Embodiment 1 of this invention shall be described below.

Figure 1:
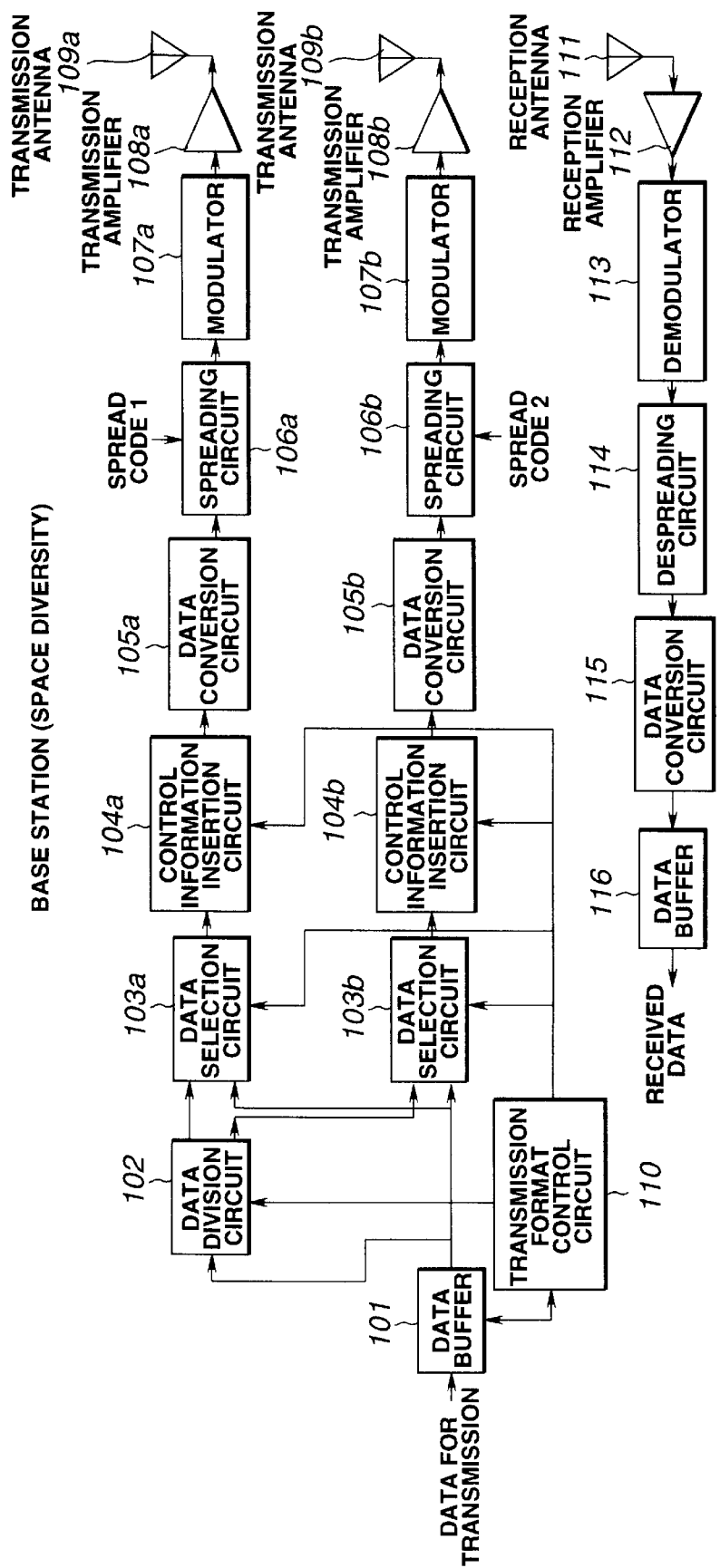
FIG. 1 is a constitutional diagram of a base station in the space diversity communication system pertaining to embodiment 1 of the invention.
Figure 2:
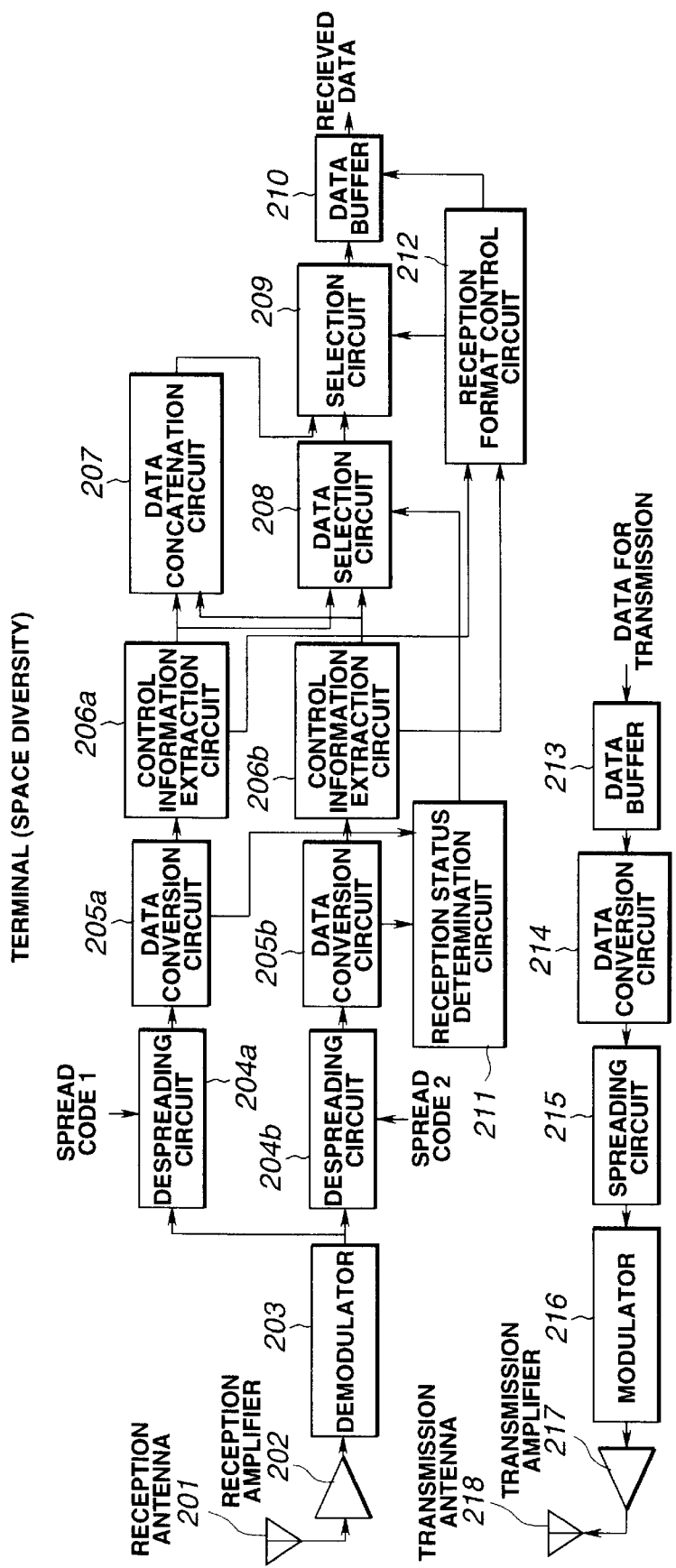
FIG. 2 is a constitutional diagram of a terminal station in the space diversity communication system pertaining to embodiment 1 of the invention.

FIG. 1 is a constitutional diagram of the base station side for a space diversity system; FIG. 2 is a constitutional diagram of the terminal side in the same system. In FIG. 1, the components ranging from the data buffer 101 through the antenna 109 constitute the transmission system, and the components ranging from the antenna 111 through the data buffer 116 constitute the reception system. In FIG. 2, the components ranging from the antenna 201 through the reception format control circuit 212 constitute the transmission system, and the components ranging from the data buffer 213 through the antenna 218 constitute the reception system. An example of a base station application is a communication means (such as a modem) for connecting to a PC LAN server. An example of a terminal application is a communication means for connecting to a PC LAN client.

The base station depicted in FIG. 1 and the terminal station depicted in FIG. 2 together form a set which constitutes a communication system. Data is transmitted primarily from the base station side to the terminal side. There are two possible transmission modes, a high-reliability transmission mode which uses space diversity to reduce the effects of fading and achieve reliable data transmission, and a high-speed transmission mode for achieving high-speed data transmission in the event that the effects of fading are negligible, or high data reliability is not required.

Figure 9:
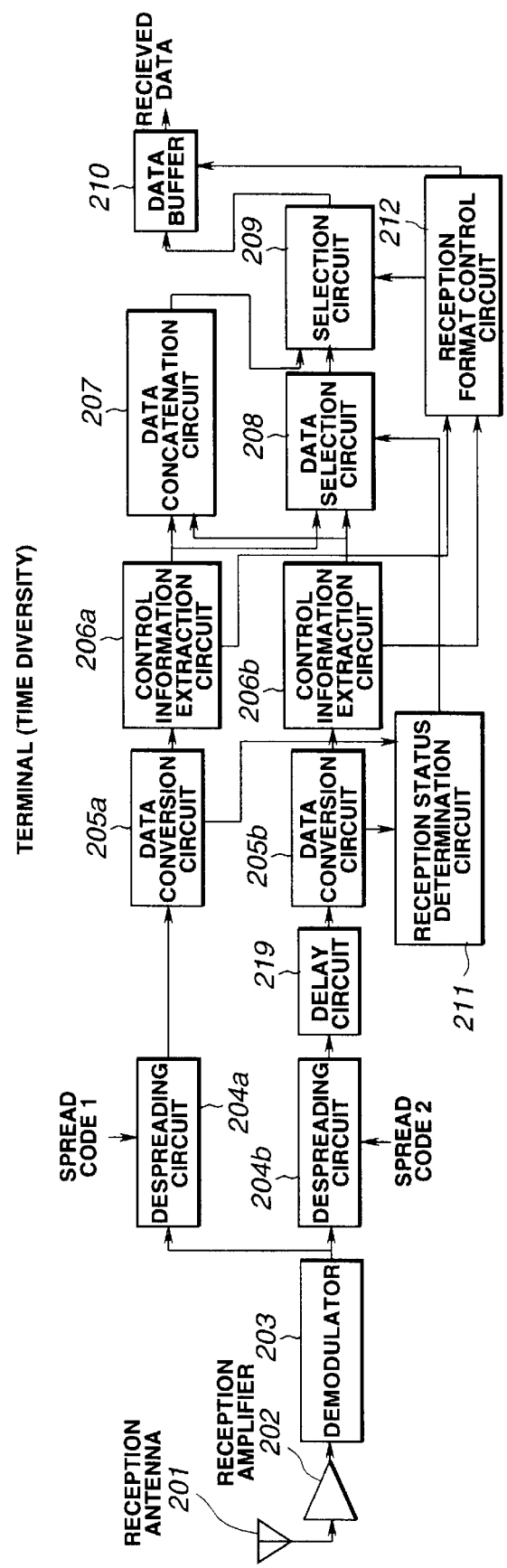
FIG. 9 is a constitutional diagram of a terminal station in the time diversity communication system pertaining to embodiment 2 of the invention.
Figure 10:
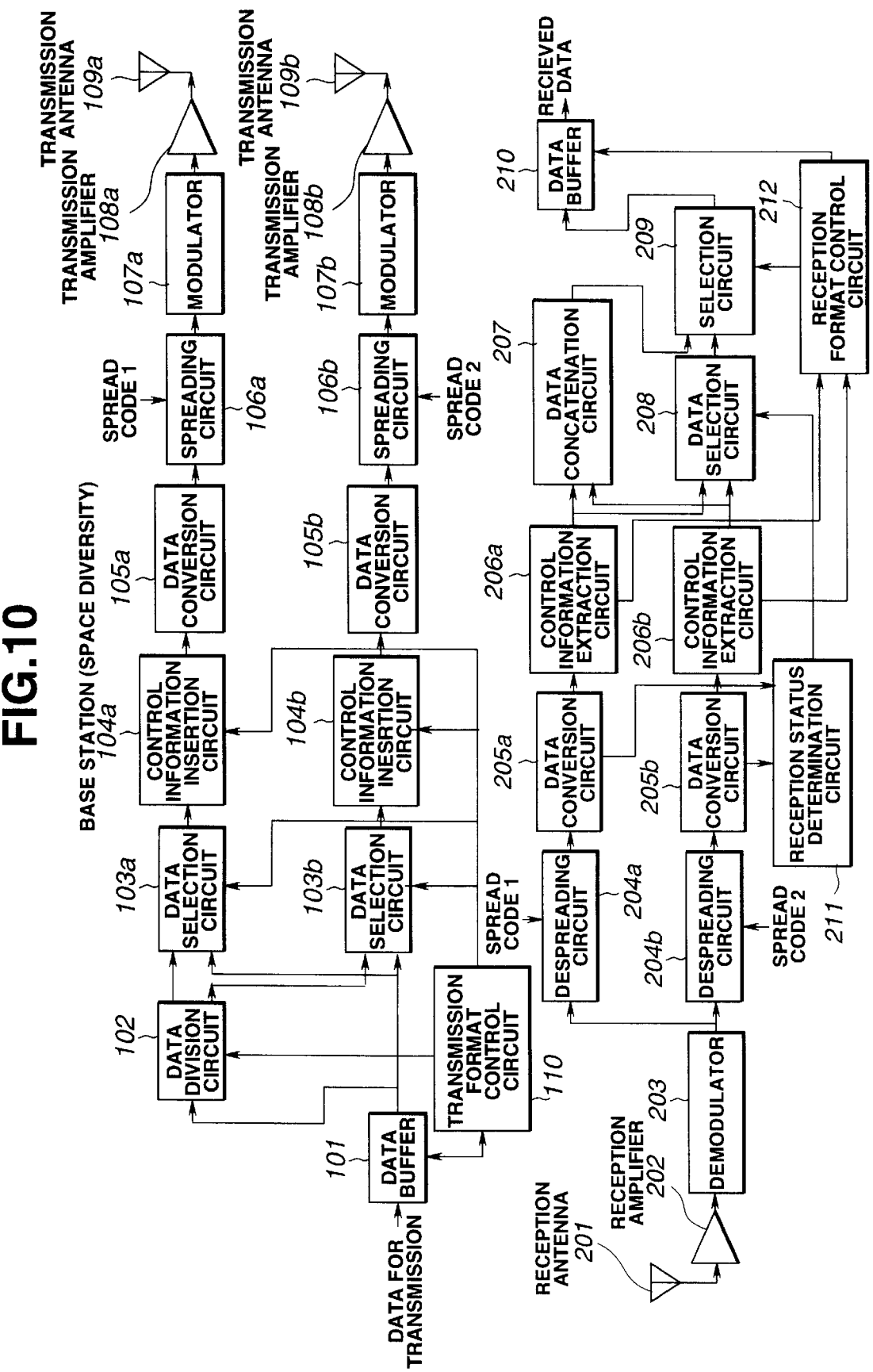
FIG. 10 is a constitutional diagram of a base station or terminal station in the space diversity communication system pertaining to another embodiment of the invention.
Figure 11:
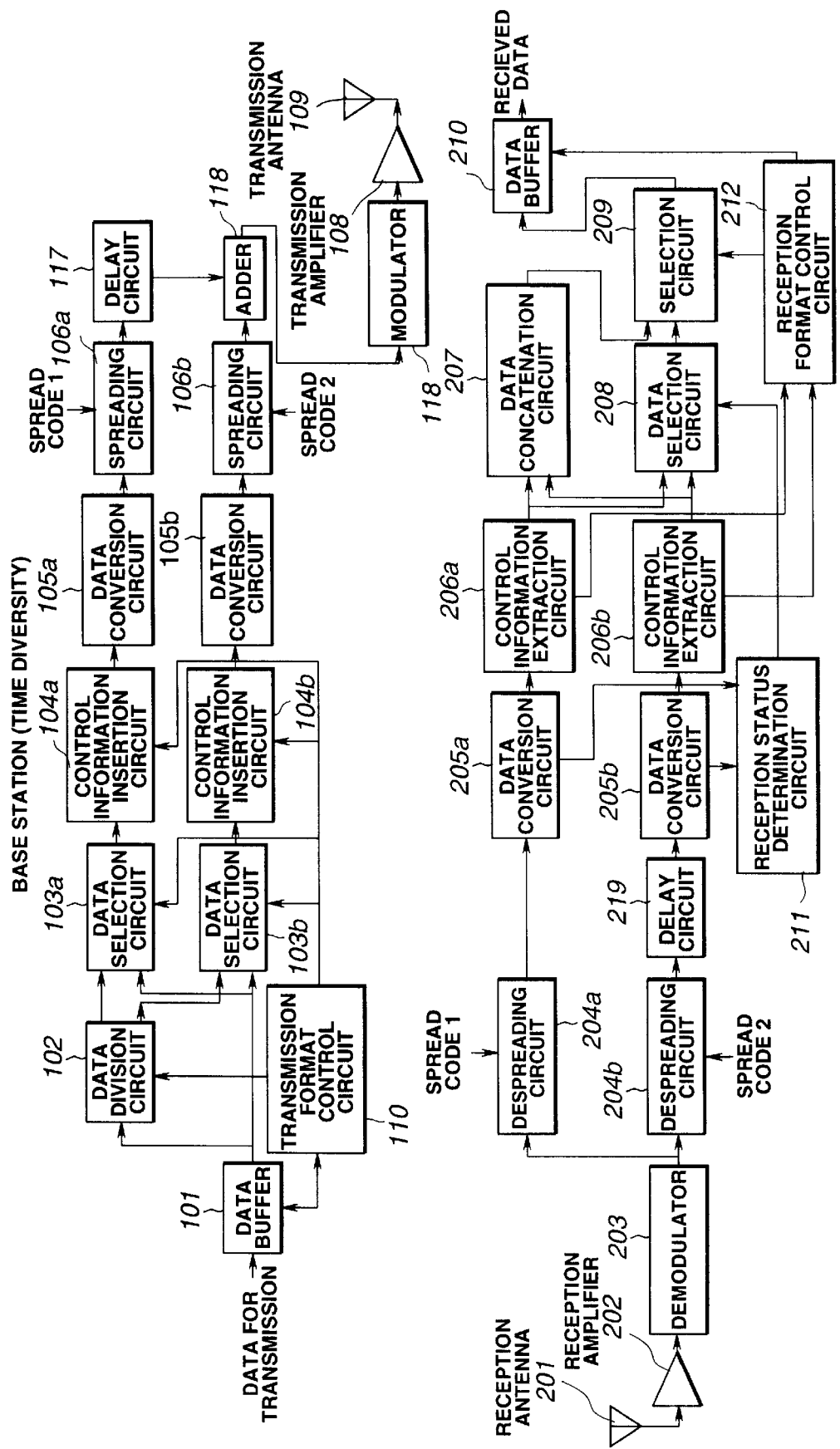
FIG. 11 is a constitutional diagram of a base station or terminal station in the time diversity communication system pertaining to another embodiment of the invention.

Bidirectional application of the invention, as depicted in FIG. 10, whereby the base station is equipped with the two transmission systems depicted in FIG. 1 and the two reception systems depicted in FIG. 2, and the terminal is equipped with the two transmission systems depicted in FIG. 1 and the two reception systems depicted in FIG. 2, also falls within the scope of the invention. Likewise, with regard to Embodiment 2, described later, bidirectional application of the invention whereby the base station is equipped with the two transmission systems depicted in FIG. 8 and the two reception systems depicted in FIG. 9, and the terminal is equipped with the two transmission systems depicted in FIG. 8 and the two reception systems depicted in FIG. 9, also falls within the scope of the invention.

Since the apparatus depicted in FIG. 1 and FIG. 2 are for use in a space diversity implementation, they are equipped respectively with a set of two transmission sections and reception sections. In FIG. 1, the components ranging from the data conversion circuit 105a through the antenna 109a constitute a first spreading/modulation/transmission section (first transmission system), and the components ranging from the data conversion circuit 105b through the antenna 109b constitute a second spreading/modulation/transmission section (second transmission system). In FIG. 2, the despreading circuit 204a and the data conversion circuit 205a together constitute a first despreading/conversion section (first reception system), and the despreading circuit 204b and the data conversion circuit 205b together constitute a second despreading/conversion section (second reception system).

In FIG. 1, the data buffer 101 receives digital data from a computer or other processing device (not shown), and temporarily stores this data while outputting it at prescribed timing to a data division circuit 102 and data selection circuits 103a and 103b.

In the event that the base station is to transmit in high-speed transmission mode, the data division circuit 102 divides the data output by the data buffer 101 and delivers it to the data selection circuits 103a and 103b. Specific examples of data division will be described later.

The data selection circuits 103a and 103b select either the first or second spreading/modulation/transmission section, depending on the transmission mode. Specifically, in high-reliability transmission mode, both data sequences from the data buffer 101 are delivered (these data sequences are identical), while in high-speed transmission mode, the data sequence that has been divided by the data division circuit 102 is delivered.

Control information insertion circuits 104a and 104b insert control information indicating the current transmission mode (information indicating either the high-reliability transmission mode or the high-speed transmission mode) into the data from the data selection circuits 103a and 103b.

Data conversion circuits 105a and 105b receive the data from the control information insertion circuits 104a and 104b and perform data conversion to render it in easily modulated form. For example, depending on whether QPSK or BPSK modulation is to be used, the data is converted into either one-bit or two-bit symbols.

Spreading circuits 106a and 106b receive data which has been converted by the data conversion circuits 105a and 105b and spreads these data sequences using different spread codes 1 and 2. The spreading process used here is generally known. Specific examples of the spread codes 1 and 2 will be given later.

Modulators 107a and 107b modulate the outputs of the spreading circuits 106a and 106b to produce high-frequency signals. Transmission amplifiers 108a and 108b amplify these outputs to the appropriate power level and deliver them to antennas 109a and 109b. The radio waves emitted into free space by the antennas 109a and 109b are received by the terminal apparatus depicted in FIG. 2. In order to achieve space diversity, it is necessary for these antennas 109a and 109b to be physically separated from each other to a certain extent.

A transmission format control circuit 110 monitors the status of the components ranging from the data buffer 101 through the control information insertion circuits 104 to determine the transmission mode, and performs prescribed control operations depending on the data transmission mode. The operation of the transmission format control circuit 110 will be described in detail later.

The constitution of the reception system of the base station will now be described. The reception system may have the constitution depicted in FIG. 1, or the constitution depicted in FIG. 10. That of FIG. 1 will be described here. An antenna 111 receives radio waves from the terminal depicted in FIG. 2 and inputs these to a reception amplifier 112.

The reception amplifier 112 amplifies the received radio waves to a prescribed level for input to a demodulator 113.

The demodulator 113 performs demodulation on the input signal and outputs a baseband signal.

A despreading circuit 114 receives the data from the demodulator 113 and despreads it with the same spread code used for spreading at the terminal side.

A data conversion circuit 115 receives the data from the despreading circuit 114 and performs a prescribed data conversion process.

A data buffer 116 receives the digital data from the data conversion circuit 115, temporarily stores it, and outputs it at prescribed timing to a computer or the like (not shown).

The constitution of the terminal will now be described. In FIG. 2, an antenna 201 receives radio waves from the base station depicted in FIG. 1 and inputs these to a reception amplifier 202.

The reception amplifier 202 amplifies the received radio waves to a prescribed level for input to a demodulator 203.

The demodulator 203 performs demodulation on the input signal and outputs a baseband signal.

Despreading circuits 204a and 204b receive the data from the demodulator 203 and despread it using spread codes 1 and 2, which are the spread codes used respectively for spreading at the terminal side.

Data conversion circuits 205a and 205b respectively receive data from the despreading circuits 204a and 204b and perform prescribed data processing. At the same time, signals indicating the level, error rate, and other reception status factors are sent to a reception status determination circuit 211.

Control information extraction circuits 206a and 206b receive data from the data conversion circuits 205a and 205b and extract the control information relating to the transmission mode which is contained in this data. The extracted control information is output to a reception format control circuit 212. The data itself is distributed to a data concatenator 207 and to a data selection circuit 208.

In order to reconstitute the original data, the data concatenation circuit 207 concatenates the data that has been divided by the base station's data division circuit 102 in high-speed transmission mode. The data concatenation circuit 207 receives data from the control information extraction circuits 206a and 206b and concatenates it. Specific examples of concatenation will be described later.

In contrast, on the basis of the output of the reception status determination circuit 211, the data selection circuit 208 selects from the data sequences transmitted by the two transmission systems during high-reliability transmission mode that data sequence which has the least errors.

On the basis of transmission mode information output by a reception format 212, a selection circuit 209 selects either the output of the data concatenation circuit 207 or the output of the data selection circuit 208. Specifically, in high-speed transmission mode it selects the output of the data concatenation circuit 207, and in high-reliability transmission mode, it selects the output of the data selection circuit 208.

A data buffer 210 receives digital data from the data selection circuit 208, temporarily stores it, and outputs it at prescribed timing to a computer or the like (not shown).

The reception status determination circuit 211 obtains information pertaining to reception status from the data conversion circuits 205a and 205b, and determines the reception status, specifically, whether the status of the radio waves entering the terminal antenna 201 from the base station antenna 109a or the status of the radio waves entering the terminal antenna 201 from the base station antenna 109b is better. This will vary depending on factors such as fading produced by the radio wave propagation path. The reception status determination circuit 211, for example, selects the input having the higher correlation value at the despreading circuit, or makes a decision using the error detection code or error correction code results, and on the basis of this determination, the data selection circuit 208 selects that data which is output from the reception system having the better status.

The reception format control circuit 212 obtains information regarding the reception format from the control information extraction circuits 206a and 206b and determines the reception format, that is, whether high-speed transmission mode or high-reliability transmission mode has been used. On the basis of this determination, the selection circuit 209 selects either the output of the data concatenation circuit 207 or the output of the data selection circuit 208.

The terminal transmission system will now be described. The reception system may have the constitution depicted in FIG. 2 or the constitution depicted in FIG. 10. The example depicted in FIG. 2 will be described here. A data buffer 213 receives digital data from a computer or other processing device (not shown), and temporarily stores this data while outputting it at prescribed timing to a data conversion circuit 214.

The data conversion circuit 214 receives the data from the data buffer 213 and performs data conversion on a per-symbol basis.

A spreading circuit 215 receives the data that has been converted by the data conversion circuit 214 and performs spreading on the data using prescribed spread codes.

A modulator 216 modulates the output of the spreading circuit 215 into a high frequency signal. A transmission amplifier 217 amplifies this output to the appropriate power level and delivers it to an antenna 218. The radio waves emitted into free space by the antenna 218 are received by the base station apparatus depicted in FIG. 1.

Operations will now be described.

As noted earlier, the communication system equipped with the base station depicted in FIG. 1 and terminal depicted in FIG. 2 has a high-reliability transmission mode and a high-speed transmission mode. The high-reliability transmission mode allows space diversity to be implemented by spreading the same data set over a single carrier frequency using different spread codes and transmitting these from separate antennas located a certain distance apart.

In high-speed transmission mode, different data sets are spread over a single carrier frequency using different spread codes, and diversity is not implemented.

The system in Embodiment 1 of the present invention is a method for realizing switching between these two modes with minimal added hardware.

Figure 3:
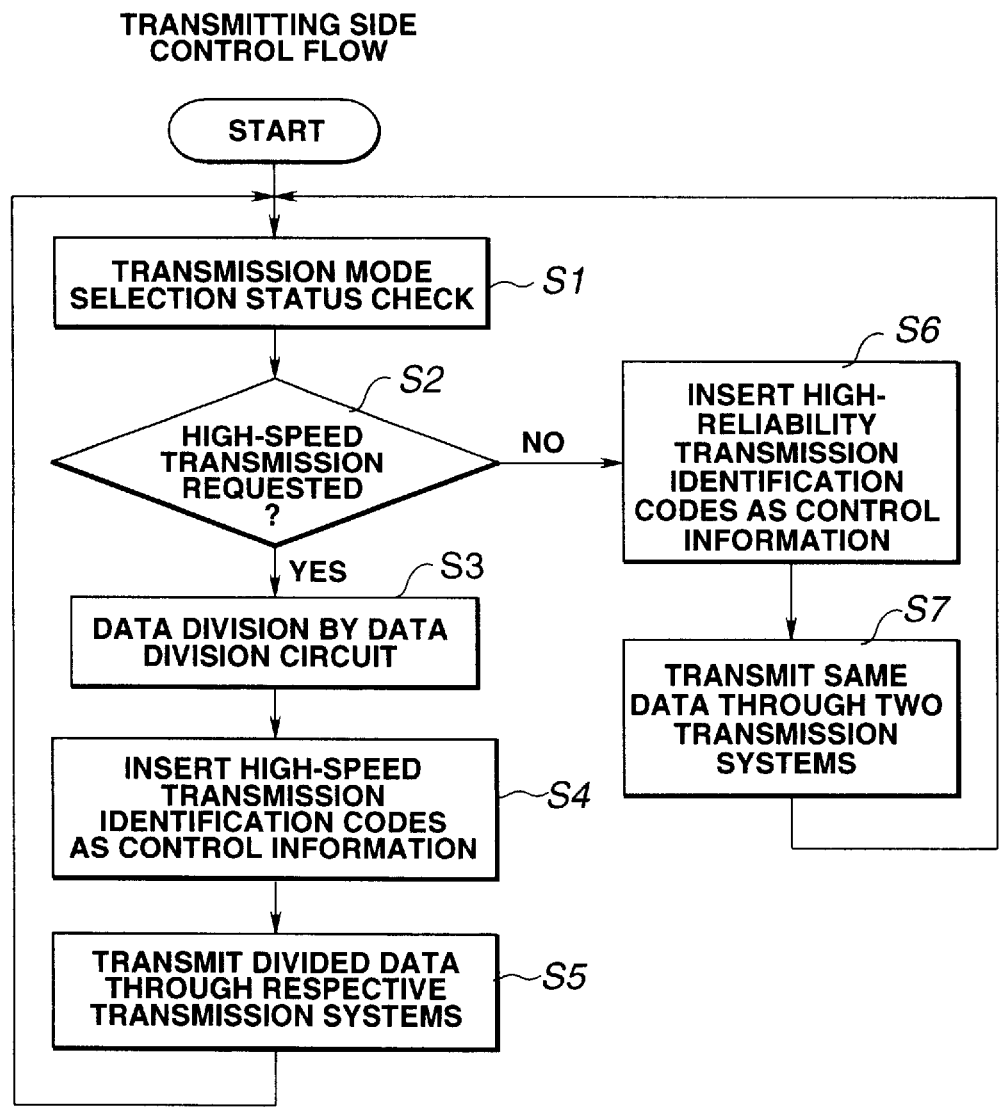
FIG. 3 is a flow chart of transmission-side control in embodiment 1 of the invention.

Operations will be described in the following order:
(1) transmitting side control process; (2) receiving side control process; (3) high-reliability/high-speed switching control algorithms; (4) data division and data concatenation processes, and; (5) control field.
(1) Transmitting side control process Control of the transmitting side (base station side) is performed primarily by the transmission format control circuit 110 depicted in FIG. 1. A flow chart of the control process is shown in FIG. 3. The transmitting side control process will be described referring to this drawing.
S1: Transmission mode selection status check A check is performed to determine which of the two transmission modes, the high-reliability transmission mode or the high-speed transmission mode, has been selected. There are various possible selection methods. Specifics are given in section (3), "High-reliability/high-speed switching control algorithms", below.
S2: High-speed transmission requested?

Where the high-speed transmission mode is the selected transmission mode (y), the system proceeds to step S3. At this point, the data selection circuits 103*a* and 103*b* select the output of the data division circuit 102.

Where the high-reliability transmission mode is the selected transmission mode (n), the system proceeds to step S6. At this point, the data selection circuits 103*a* and 103*b* select the output of the data buffer 101.
S3: Data division by data division circuit Where the high-speed transmission mode has been selected, high speed transmission utilizing both the first transmission system and the second transmission system simultaneously is enabled by having the data division means 102 divide the data to be transmitted (for example, data A+B would be divided into data A and data B). Specifics of the division process are described below in section (4), "Data division and data concatenation processes".
S4: Insert high-speed transmission identification codes as control information Identification codes for indicating that high-speed transmission mode is being used are inserted by control information insertion means 104*a* and 104*b*. This information is inserted in the form of control information for each frame of transmitted data. The identification codes are described in section (5), "Control field". Since the inserted identification codes are the same, the high-speed transmission mode identification codes are able to be selected by either the first reception system or the second reception system of the terminal.

Figure 4:
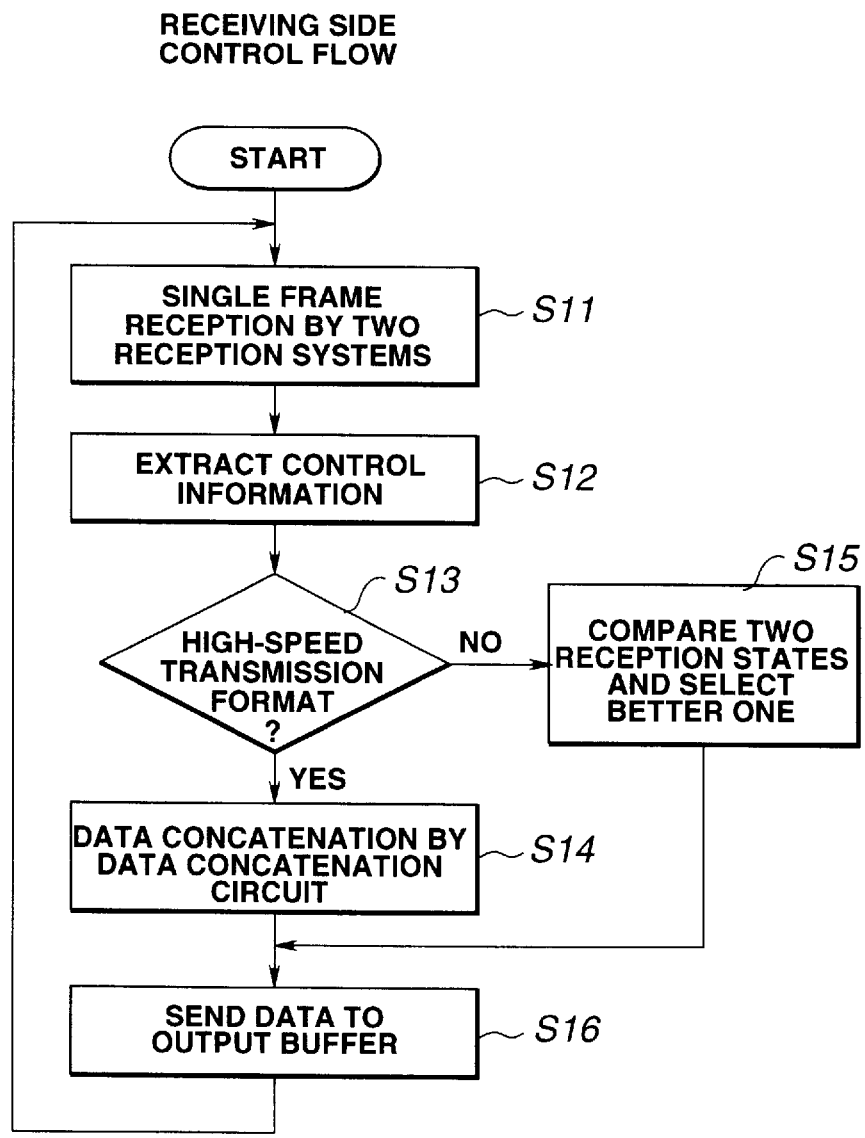
FIG. 4 is a flow chart of receiving-side control in embodiment 1 of the invention.

It is also possible to insert high-speed transmission mode identification codes into only one of the signals. High-speed transmission mode is mainly selected where radio wave propagation conditions are relatively good. Both the signal transmitted by the first transmission system (spread code 1) and the signal transmitted by the second transmission system (spread code 2) reach the terminal side. Thus, where identification codes have been inserted into only one of the signals, this fact can be readily determined at the terminal side. The system into which identification codes will be inserted is determined in advance. In this way, the identification codes can be eliminated from one of the signals, allowing a correspondingly greater amount of data to be transmitted.
S5: Transmit divided data through respective transmission systems The first transmission system (data selection circuit 103*a* through antenna 109*a*) and the second transmission system (data selection circuit 103*b* through antenna 109*b*) respectively transmit data A and data B. Thus, the transmission speed is twice that in high-reliability transmission mode.
S6: Insert high-reliability transmission identification codes as control information Identification codes indicating that high-reliability transmission mode is being used are inserted by control information insertion means 104*a* and 104*b*. Since the inserted identification codes are the same, the high-speed transmission mode identification codes are able to be selected by either the first reception system or the second reception system of the terminal. Since the identification codes can be detected by at least one of the reception systems because of space diversity, virtually no cases in which identification code detection is impossible occur, even under conditions of poor radio wave propagation.
S7: Transmit same data through two transmission systems The first transmission system (data selection circuit 103*a* through antenna 109*a*) and the second transmission system (data selection circuit 103*b* through antenna 109*b*) each transmit the same data output from the data buffer 101.
(2) Receiving side control process Control of the receiving side (terminal side) is performed primarily by the reception format control circuit 212 depicted in FIG. 2. A flow chart of the control process is shown in FIG. 4. The receiving side control process will be described referring to this drawing.
S11: Single frame reception by two reception systems The first reception system (despreading circuit 204*a* through control information extraction circuit 206*a*) and the second reception system (despreading circuit 204*b* through control information extraction circuit 206*b*) each receive a single frame (a single unit of transmitted data). The spread codes 1 and 2 used by the two reception systems are the same as those used respectively by the base station transmission systems.
S12: Extract control information Control information (identification codes) is extracted from the received data by the control information extraction circuits 206*a* and 206*b* in order to determine the transmission mode. Where identification codes have been inserted into data from both transmission systems, the identification codes are extracted from them by both of the control information extraction circuits 206*a* and 206*b*; where identification codes have been inserted into one sequence only, the identification codes are extracted therefrom by one of the control information extraction circuits 206*a* and 206*b*.

S13: High-speed transmission format?

Where the high-speed transmission mode is the selected transmission mode (y), the system proceeds to step S14. At this point, the data selection circuit 209 selects the output data from the data concatenation circuit 207.

Where the high-reliability transmission mode is the selected transmission mode (n), the system proceeds to step S15. At this point, the data selection circuit 209 selects the output data from the data selection circuit 208.

S14: Data concatenation by data concatenation circuit

In high-speed transmission mode, the divided data is concatenated by the data concatenation circuit 207 (transforming data A and data B into data A+B).

S15: Compare two reception states and select better one

In high-reliability transmission mode, the reception status determination circuit 211 and the data selection circuit 208 select the output of the first reception system or the output of the second reception system, depending on which of them has the higher power level or the lower error rate, for example.

S16: Send data to output buffer

The output from the selection circuit 209 is output to the data buffer 210.

(3) High-reliability/high-speed switching control algorithms

Next, specific examples of high-reliability/high-speed switching control algorithms will be given. For convenience, the following discussion assumes control of transmission from the base station to the terminal.

(a) Terminal-specific fixed assignment technique

This is a technique whereby individual terminals are assigned high-reliability transmission mode or high-speed transmission mode on a fixed basis according to terminal status.

Terminal status is determined when a terminal initially connects with the base station, at which point the transmission mode is assigned on a fixed basis. For example, in the case of a terminal which requires high-speed transmission, a stationary terminal that is not mobile, or a terminal that always has stable radio wave status, the data error rate is generally not very high, so high-speed transmission mode is used on a fixed basis. On the other hand, in the case of a terminal which requires high-reliability transmission, a mobile terminal, a terminal located in an area with poor radio wave status, and similar cases, the data error rate may be expected to be rather high, so high-reliability transmission mode is used on a fixed basis. The transmission mode to be adopted for each individual terminal is decided in advance.

With this method, the transmission mode is stationary over a single connection session, and the transmission mode will not switch during the session. While the method is simple, it is highly practical as terminals can be accommodated individually according to their requirements.

Further, circuitry for the unneeded mode can be eliminated for those terminals for which the use of one of the two transmission modes has been predetermined on a fixed basis. For example, in high-reliability transmission mode, the control information extraction circuit 206, the data concatenation circuit 207, the selection circuit 209, and the reception format control circuit 212 are unnecessary, while in high-speed transmission mode, the data selection circuit 208, the selection circuit 209, the reception status determination circuit 211, and the reception format control circuit 212 are unnecessary.

(b) Terminal-initiated non-periodic switching technique when high-speed transmission is required In this technique, a switch to high-speed transmission can be made when necessary, such as when an application requiring high-speed transmission is run at the terminal side, on the basis of a request from the terminal.

While transmission normally takes place in high-reliability mode, when a program that has large data requirements, such as a video application, is to be executed at the terminal, it issues a request to the base station to initiate a switch to high-speed transmission mode. When the terminal side no longer requires high-speed transmission mode, it issues a request to return to high-reliability transmission mode. This technique allows the transmission mode to be selected as appropriate depending on operation conditions on the terminal side, enhancing the processing efficiency of the system overall.

The transmission mode switch request signal is input to the terminal side data buffer 213, and is then transmitted using the data conversion circuit 214, the spreading circuit 215, the modulator 216, the transmission amplifier 217, and the antenna 218 depicted in FIG. 2. The transmitted switch request signal passes through the antenna 111, the reception amplifier 112, the demodulator 113, the despreading circuit 114, the data conversion circuit 115, and the data buffer 116 depicted in FIG. 1, and is then input to a processing component (not shown). The transmission format control circuit 110 switches the transmission mode in response to the received switch request signal.

(c) Error rate-prompted automatic switching technique

In this technique, the error rate is monitored at the terminal side, and high-reliability transmission is used when the error rate is high.

While transmission normally takes place in high-speed mode, when it is determined at the terminal side that the error rate is high, a request is issued to the base station to switch transmission to the high-reliability transmission mode. If it is subsequently determined that the error rate has dropped, a request is issued to the base station to return to the high-speed transmission mode. This technique allows the transmission mode to be selected as appropriate depending on signal transmission conditions, enhancing the processing efficiency of the system overall.

In FIG. 2, the reception status determination circuit 211 monitors the error rate, and on the basis of the output of the monitoring operation, inputs a reliability transmission mode switch request signal to the data buffer 213. Subsequent operations are similar to those described earlier.

(d) Remaining transmission buffer capacity-prompted automatic switching technique In this technique, a switch to high-speed transmission mode is made when the remaining capacity in the base station transmission buffer reaches a low level. Transmission buffer overflow can result in loss of data. This technique prevents this from happening.

While transmission normally takes place in high-reliability transmission mode, a switch to high-speed transmission mode is made when the remaining capacity in the transmission buffer reaches a low level. The former mode is resumed when the buffer capacity increases. By selecting the appropriate transmission mode and adjusting the transmission speed in accordance with transmission buffer conditions, efficient data transmission can be realized, enhancing the processing efficiency of the system overall.

In FIG. 1, data from a processing device (not shown) is input to the data buffer 101 at a prescribed speed. When a large burst of data is input, the remaining capacity in the data buffer 101 declines. The transmission format control circuit 110 monitors the remaining capacity in the data buffer 101 and selects the transmission mode on the basis of the results of monitoring. This technique does not take into consideration conditions at the terminal side, thus obviating the need for a base station reception system (the antenna 111 through the data buffer 116) and a terminal side transmission system (the data buffer 213 through the antenna 218).

(e) Re-sent frame high-reliability transmission switching technique

In this technique, high-reliability transmission mode is used only for transmitting data that has been requested to be re-sent due to errors. Depending on the communication protocol, requests to re-send data are sometimes made to the base station side. If there are errors in the re-sent data as well, resulting in the issuance of a further re-send request, efficiency become extremely poor. For this reason, re-sent data is transmitted in high-reliability transmission mode in order to achieve accurate data transmission.

While transmission normally takes place in high-speed transmission mode, a switch to high-reliability transmission mode is made only during re-sending in response to an error frame re-send request. The re-send request is sent from the terminal transmission system depicted in FIG. 2 and is received by the base station reception system depicted in FIG. 1. This is detected by the transmission format control circuit 110, which then switches the reliability transmission mode to the switch high-reliability transmission mode.

(f) Transmitted data contents-prompted switching technique

In this technique, a determination is made at the base station side as to whether high reliability is required by referring to the contents of the transmitted data, and switching is performed accordingly.

In cases where, through some method, the contents of transmitted data are known, the base station side makes a determination as to whether high reliability or high speed is required in data transfer, and switches the transmission mode accordingly. For example, data headers may be provided with blanks indicating the transmission mode. Examples of data that require high-reliability transmission are programs, commands, and high-priority data. Examples of data that do not really require high-reliability transmission are image data, character data, and low-priority data.

(g) Protocol-prompted switching technique

In this technique, switching is performed in accordance with whether a protocol assumes a low error rate or not.

When data of a protocol that assumes a low error rate transmission path is transmitted, the high-reliability transmission mode is used; if such is not the case, the high-speed transmission mode is used. Protocols can be distinguished using blanks in data headers, specification by the user, or other method.

(4) Data division and data concatenation processes

The processes performed by the data division circuit 102 on the transmitting side and the data concatenation circuit 207 on the receiving side in high-speed transmission mode will now be described.

The data division circuit 102 is a circuit for dividing a single data input into two data outputs in order to double the input data rate. Where the data transmission rate is fixed, the input data rate can be doubled simply by dividing a single input into two outputs. The number of divisions is not limited to 2, and values of 3 or greater may be used. A plurality of base station transmission systems and terminal station reception systems may be provided in accordance with the number of data divisions. The data transmission rate increases with the number of data divisions (theoretically, data divisions of 3, 4, . . . will produce data transmission rate increases of 3×, 4×, . . . ).

Examples of data division methods are given below. For convenience, the two outputs are designated as A and B.

(a) Frame unit division

Figure 5:
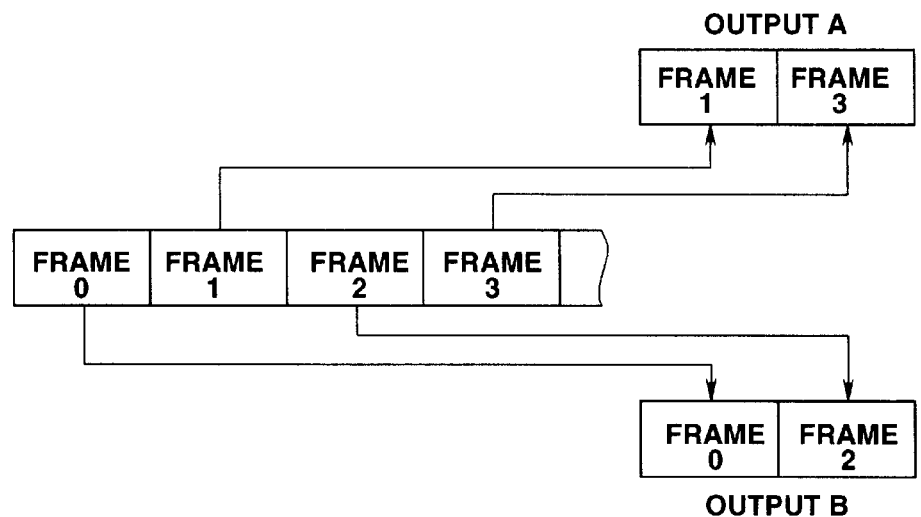
FIG. 5 is an illustrative diagram of a data division process in embodiment 1 of the invention.

In systems where data is transmitted in frame units, it is possible to divide the frame units in an alternating manner. As shown in FIG. 5 for example, a frame unit division scheme whereby odd-numbered frames 1, 3, . . . are output to A and even-numbered frames 0, 2, . . . are output to B is possible. Dividing up frames in this way is possible because both the division process and the concatenation process are performed in a sequential manner. Of course, it would also be possible to divide frames into units comprising two (or more) adjacent frames, for example, outputting frames 0, 1, 4, 5, . . . to A and frames 2, 3, 6, 7 . . . to B.

(b) Bit unit division

Figure 6:
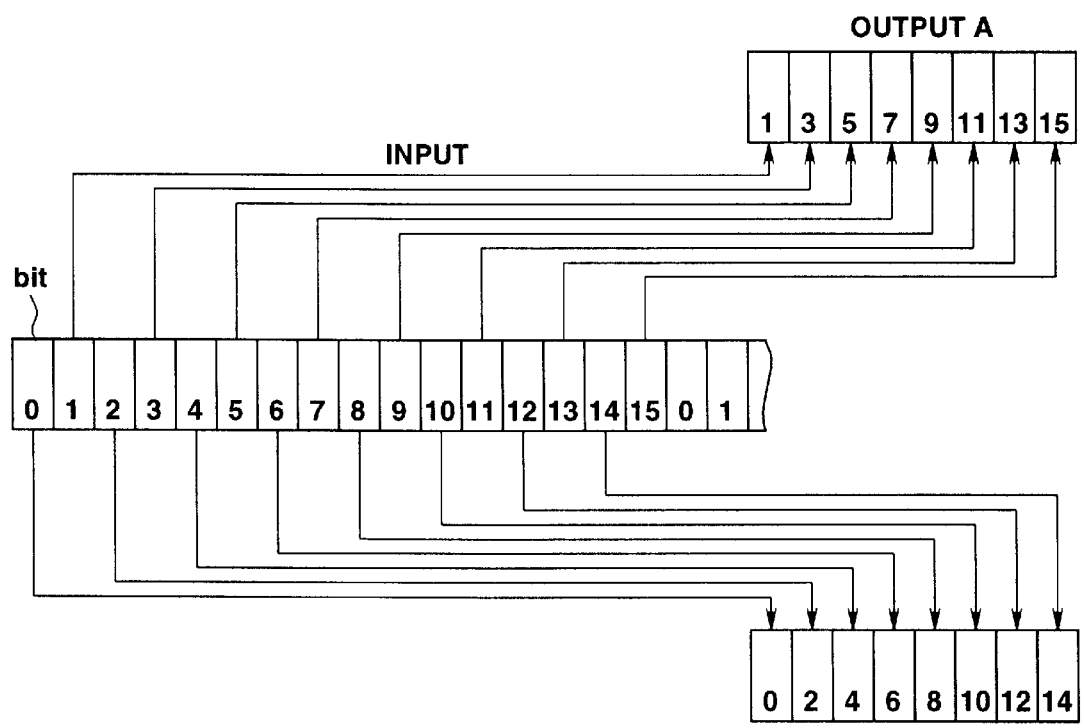
FIG. 6 is an illustrative diagram of another data division process in embodiment 1 of the invention.

In this method, data bit units are divided in an alternating manner. As shown in FIG. 6 for example, a method whereby odd-numbered bits 1, 3, . . . are output to A and even-numbered bits 0, 2, . . . are output to B is possible. This method can be implemented in cases where data is not assembled into frames, and thus has a wide range of application.

(c) Division into blocks of appropriate size

Methods which divide data into byte/word/long word units or into long code block units in an alternating manner are also possible. The specific division methods are similar to those in (a) and (b), above.

(d) Code division of convolutional codes

When convolutional codes such as rate 1/2 are used, of the two main output of the convolutional encoder, one output is assigned to A and the other output is assigned to B. This requires no division process, so the constitution and process are rather simple.

(e) Dual independent channel assignment

Where two independent channels can be delineated by a host protocol, data can be assigned to the respective channels A and B. For example, in the case of digital voice transmission, the left stereo channel sound can be assigned to A and the right channel sound to B.

The data concatenation process will now be described. The data concatenation circuit 207 is a circuit for performing concatenation of data that has been divided by the data division circuit 102, in order to restore it to its original order. In other words, it is a circuit for transforming two divided outputs into a single output. In concatenation, it is necessary to know how the data division circuit 102 on the transmitting side has divided the data. The data division circuit 102 may use a division method which is fixed for the system, or the system may allow the division method to be varied dynamically. In the latter case of a variable division method, distinguishing information about the division method is entered into the control field, discussed later, and the division method information is sent to the data concatenation circuit 207. The data concatenation circuit 207 performs concatenation on the basis of this information. The specific process is the reverse of the division process; the reader is referred to FIG. 5 and FIG. 6.

(5) Control field

Figure 7:
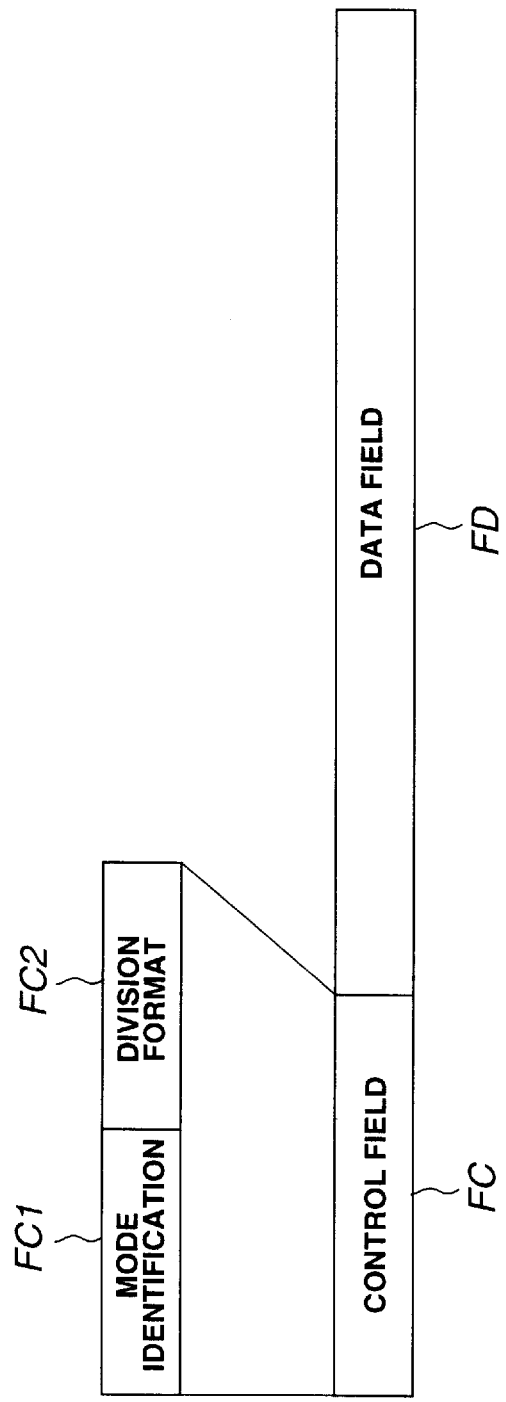
FIG. 7 is an illustrative diagram of a control field in embodiment 1 of the invention.

A control field is a field that contains control information so that data can be correctly demodulated at the terminal side. It is generally located in the lead position ahead of the transmitted data field FD. An example of a control field FC is depicted in FIG. 7.

The control field contains the following information.

(a) Mode identifying information FC1

Information indicating whether the transmission mode is high-reliability transmission mode or high-speed transmission mode.

(b) Data division format information FC2

Information indicating which data division format (for example, the aforementioned (4)(a) through (e)) has been selected in high-speed transmission mode. Not required where the division method is fixed for the system.

On the transmitting side, this information is inserted before or after the actual information field (data field) by the control information insertion circuit 104. On the receiving side, the control field is extracted from a received frame by the control information extraction circuit 206, and the reception format control circuit 212 detects the mode in which the frame has been transmitted. On this basis, the reception format control circuit 212 controls the data concatenation circuit 207 and the selection circuit 209 such that the received data can be correctly reconstituted.

Regarding selection of the spread codes 1 and 2, codes with low cross-correlation values should be selected. Known examples of spread codes are M sequences, GOLD code sequences, and multivalue sequences. Preferably, cross-correlation values will be specifically computed, and sequences with values that present no practical problems in terms of effect on each other selected. A specific method for spread code selection is the method disclosed in Japanese Laid-Open Patent Application 7-107007 (e.g., listed in Table 1).

As outlined above, Embodiment 1 of this invention offers a communication system, a communication device, and a method which have the following merits.

(1) It is possible to equip the base station with two or more transmission systems and the terminal with two or more reception systems and to implement space diversity using these multiple transmission systems and reception systems during high-speed transmission mode to achieve high-reliability transmission with minimal transmission error. In addition, by dividing data and transmitting different data sequences utilizing the plurality of transmission systems and reception systems during high-speed transmission mode, it is possible to increase the transmission speed in accordance with the number of divisions. Enabling this manner of transmission mode switching allows the optimal transmission mode to be selected, affording efficient data transmission. The overall performance of the communication system is enhanced as a result. In conventional systems, one of the reception systems is idle when data is transmitted in the high-reliability transmission mode, resulting in inefficiency.

(2) By equipping the base station with a reception system and the terminal with a transmission system, and employing these to send control commands for selecting the transmission mode, it becomes possible to switch the transmission mode as the terminal side requires. This allows the transmission mode to be selected taking into account receiving side requests, rather than transmitting side considerations exclusively, thus enhancing the overall performance of the communication system.

(3) Since control fields are used to switch between transmission modes and to switch among division methods, the mode and method optimal for each data transmission can be selected. The method permits fine setting of mode and other variables, thus enhancing the overall performance of the communication system. For example, settings can be made on an individual terminal basis, and for a given terminal, settings can be made on by-protocol, by-data sequence, or by-communication status basis.

In the communication system depicted in FIG. 1 and FIG. 2, the base station side is equipped with two antennas 109 in order to implement space diversity, but it would also be possible to equip the terminal side with two antennas. The particular deployment may be selected on the basis of considerations such as the space available for equipment installation, installation conditions, and simplicity of design. For example, where it is desirable to make the terminal apparatus simple and compact, the base station side may be equipped with two antennas, as shown in FIG. 1 and FIG. 2. To achieve optimal space diversity while adjusting antenna position at the terminal side, it would be favorable to equip the terminal side with two antennas.

Embodiment 2 of the Invention

The communication system of Embodiment 1 of the invention relied on space diversity, but the invention is not limited thereto and permits of implementation using time diversity.

Figure 8:
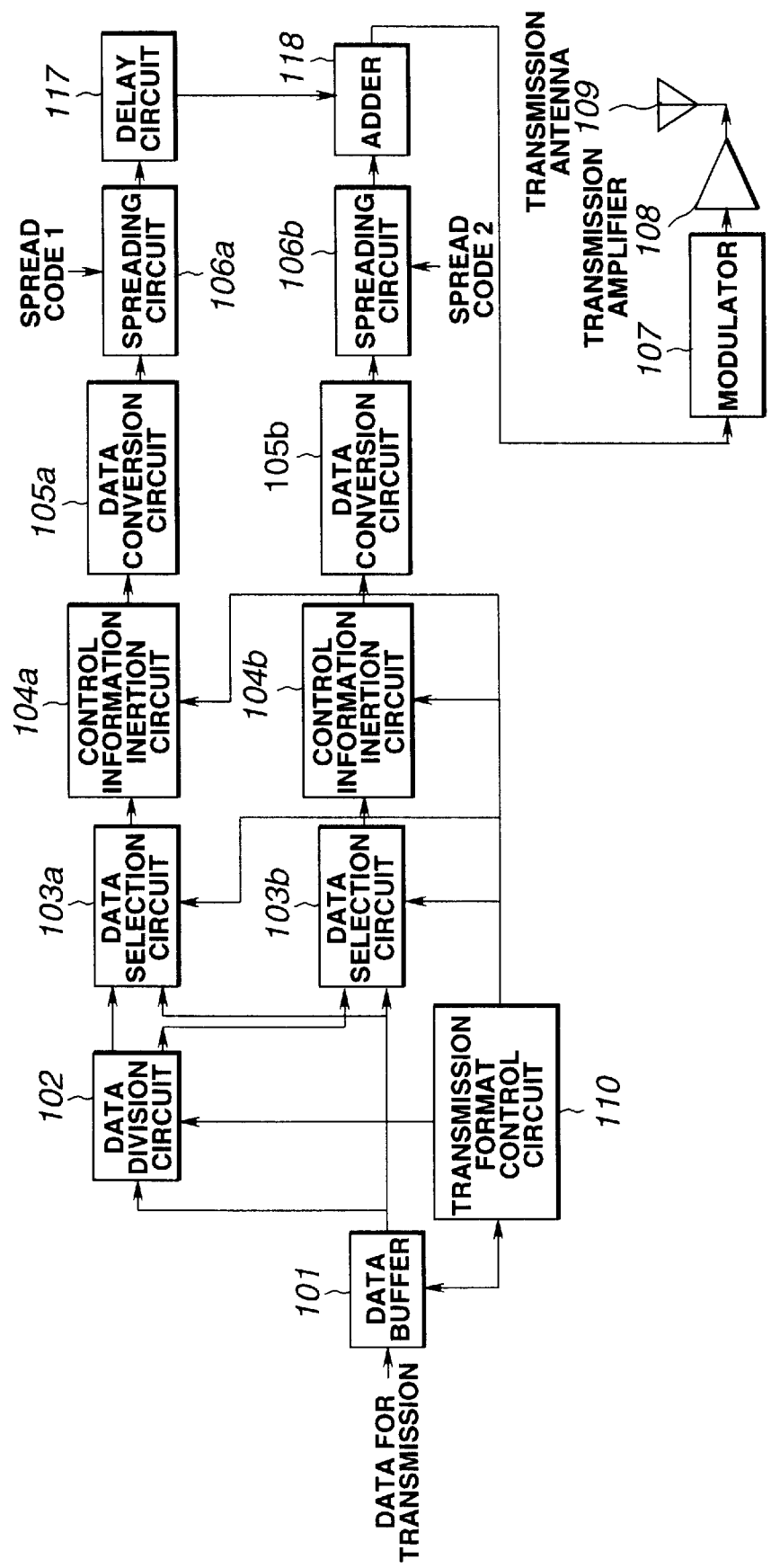
FIG. 8 is a constitutional diagram of a base station in the time diversity communication system pertaining to embodiment 2 of the invention.

A constitutional diagram of a base station pertaining to embodiment 2 of the invention is given in FIG. 8. In the drawing, a delay circuit 117 delays by a prescribed time interval the data which has been subjected to spectrum spreading by the spreading circuit 106a. An adder 118 adds the output of the spreading circuit 106a with the output of the delay circuit 117. Other block operations are essentially identical to those in Embodiment 1 of the invention.

In high-reliability transmission mode, a single carrier frequency is used at the base station depicted in FIG. 8. The spreading circuits 106a and 106b spread the same data sequence using different spread codes 1 and 2. One of the spread sequences is delayed by the delay circuit 117, subjected to addition by the adder 118, and transmitted from the one antenna 109. In this way, the same data is transmitted in different time frames to achieve time diversity.

In contrast, in high-speed transmission mode, a single carrier frequency is used, and two different data sequences which have been divided by a data division circuit 102 are spread by the spreading circuits 106a and 106b using different spread codes. One of the spread sequences is delayed by the delay circuit 117, subjected to addition by the adder 118, and transmitted from the one antenna 109. In this way, data is transmitted only once, without implementing diversity.

A constitutional diagram of a terminal pertaining to embodiment 2 of the invention is given in FIG. 9. In the drawing, a delay circuit 219 delays the data in accordance with the delay time set by the base station delay circuit 117. The delayed data is input to a data conversion circuit 205b. Other block operations are essentially identical to those in Embodiment 1 of the invention.

In high-reliability transmission mode, in the terminal depicted in FIG. 9, the signals which have been received by the single reception antenna 201 are despread by despreading circuits 204a and 204b using different spread codes, and one of the signals (the output of the despreading circuit 204b) is delayed by the delay circuit 219 by a time interval corresponding to the time diversity time interval. The received data sequences (which contain the same data) are then determined by a reception status determination circuit 211, and the one having the better reception status is selected by a data selection circuit 208.

In contrast, in high-speed transmission mode, the signals which have been received by the single reception antenna 201 are despread by the despreading circuits 204a and 204b using different spread codes, and the data sequences (which have been divided and contain different data) are concatenated by a data concatenation circuit 207.

Switching between these two modes is performed by a reception format control circuit 212 on the basis of the information fields extracted from the received data by control information extraction circuits 206a and 206b.

The communication system, communication device, and method pertaining to Embodiment 1 of the invention afford an effect equivalent to those pertaining to Embodiment 1 of the invention.

In the foregoing discussion, the example of a data division number of 2 was given, but the data division number is not limited to 2, and may be any integer of 3 or greater. The transmission systems and reception systems (in space diversity implementation, the antennas as well) should be provided in numbers equivalent to the data division number.

What is claimed is:

1. A transmitter employing a spread spectrum communication technique, comprising:
    transmission format control means for deciding whether to perform data transmission in a first transmission mode or in a second transmission mode;
    data division means for dividing data for transmission into a first portion and a second portion in the event that data is to be transmitted in said second transmission mode;
    a first transmission system which uses a first code for spreading said data for transmission in the event that the data is to be transmitted in said first transmission mode, or which uses said second code for spreading said first portion of the data in the event that the data is to be transmitted in said second transmission mode, and which transmits the data, and;
    a second transmission system which uses a second code for spreading said data for transmission in the event that data is to be transmitted in said first transmission mode, or which uses the first code for spreading said second portion of the data in the event that the data is to be transmitted in said second transmission mode, and which transmits the data.

2. A transmitter according to claim 1, wherein
    said first transmission mode is a multiplexing high-speed transmission mode employing spread spectrum, and;
    said second transmission mode is a high-reliability mode employing diversity.

3. A transmitter according to claim 1, wherein said transmission format control means decides the transmission mode for each transmitter on the basis of predetermined information.

4. A transmitter according to claim 1, further comprising:
    a reception system for receiving external data;
    wherein said transmission format control means decides the transmission mode on the basis of data received by said reception system.

5. A transmitter according to claim 1, wherein said transmission format control means decides the transmission mode on the basis of the transmission error rate.

6. A transmitter according to claim 1, wherein said transmission format control means decides the transmission mode on the basis of remaining capacity in a transmission buffer.

7. A transmitter according to claim 1, wherein said transmission format control means decides the transmission mode on the basis of presence or absence of re-sent frames.

8. A transmitter according to claim 1, wherein said transmission format control means decides the transmission mode on the basis of the degree of importance of the transmitted data contents.

9. A transmitter according to claim 1, wherein said transmission format control means decides the transmission mode on the basis of communication protocol.

10. A transmitter according to claim 1, further comprising
    first control information insertion means for appending information concerning the transmission mode to the data input to said first transmission system, and;
    second control information insertion means for appending information concerning the transmission mode to the data input to said second transmission system.

11. A transmitter according to claim 1, wherein said data division means divides the data for transmission into predetermined units, and attaches information concerning the divisions to the data for transmission.

12. A transmitter according to claim 1, wherein in the event that the data for transmission has a plurality of independent channels, said data division means divides the data each channel.

13. A receiver employing a spread spectrum communication technique, comprising:
    a first reception system for despreading transmitted data with a first code;
    a second reception system for despreading transmitted data with a second code;
    reception format control means for determining whether data transmission has been performed in a first transmission mode or a second transmission mode;
    selection means for selecting and outputting either data output by said first reception system or data output by said second reception system, whichever has better communication quality, when data is transmitted in said first transmission mode, and;
    combining means for combining data output by said first reception system with data output by said second reception system when data is transmitted in said second transmission mode.

14. A receiver according to claim 13, further comprising a transmission system for transmitting data to the outside; wherein said transmission system transmits data which indicates the transmission mode.

15. A receiver according to claim 13, further comprising
    first control information extraction means for extracting information relating to the transmission mode from the data obtained through said first reception system, and;
    second control information extraction means for extracting information relating to the transmission mode from the data obtained through said second reception system;
    wherein said reception format control means determines the transmission mode on the basis of one of the outputs of said first and second control information extraction means at least.

16. A receiver according to claim 13, wherein said combining means performs combination on the basis of information concerning divisions which has been appended to the transmitted data.

17. A communication system employing a spread spectrum communication technique, comprising:
    a transmitter including:
        transmission format control means for deciding whether to perform data transmission in a first transmission mode or in a second transmission mode;
        data division means for dividing data for transmission into a first portion and a second portion in the event that data is to be transmitted in said second transmission mode;
        a first transmission system which uses a first code for spreading said data for transmission in the event that the data is to be transmitted in said first transmission mode, or which uses said second code for spreading said first portion of the data in the event that the data is to be transmitted in said second transmission mode, and which transmits the data, and a second transmission system which uses a second code for spreading said data for transmission in the event that data is to be transmitted in said first transmission mode, or which uses the first code for spreading said second portion of the data in the event that the data is to be transmitted in said second transmission mode, and which transmits the data, and a receiver including:
   a first reception system for despreading transmitted data with a first code;
   a second reception system for despreading transmitted data with a second code;
   reception format control means for determining whether data transmission has been performed in a first transmission mode or a second transmission mode;
   selection means for selecting and outputting either data output by said first reception system or data output by said second reception system, whichever has better communication quality, when data is transmitted in said first transmission mode, and
   combining means for combining data output by said first reception system with data output by said second reception system when data is transmitted in said second transmission mode;
wherein communication is performed in one of said first transmission mode and said second transmission mode.

18. A communication method employing a spread spectrum communication technique, comprising:

a transmission mode decision step whereby the first transmission mode or the second transmission mode is selected for data transmission;

a first spreading step whereby, in the event that data is to be transmitted in said first transmission mode, the same data is subjected separately to spreading with a first code and to spreading with a second code, and each of these coded forms is output;

a division step whereby, in the event that data is to be transmitted in said second transmission mode, the data is divided into a first portion and a second portion;

a second spreading step whereby the data of said first portion is spread using said first code and output, and the data of said second portion is spread using said second code and output;

a despreading step whereby transmitted data is despread with said first code and with said second code;

a transmission mode determination step whereby a determination is made as to whether data transmission has taken place in said first transmission mode or in said second transmission mode;

a selection step whereby, in the event that it is determined that the data has been transmitted in said first transmission mode, either the data that has been despread with said first code in said despreading step or the data that has been despread with said second code is selected, depending upon which has the better communication quality, and;

a combining step whereby, in the event that it is determined that the data has been transmitted in said second transmission mode, the data that has been despread with said first code in said despreading step is combined with the data that has been despread with said second code, and output.

* * * * *